CHARLES O. YALE.
Improvement in Self-Locking Screw-Bolts for Safes.
No. 115,007.   Patented May 16, 1871.
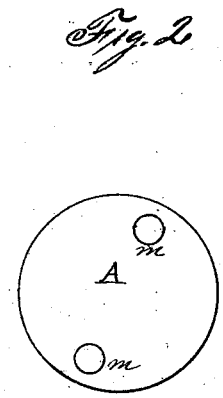
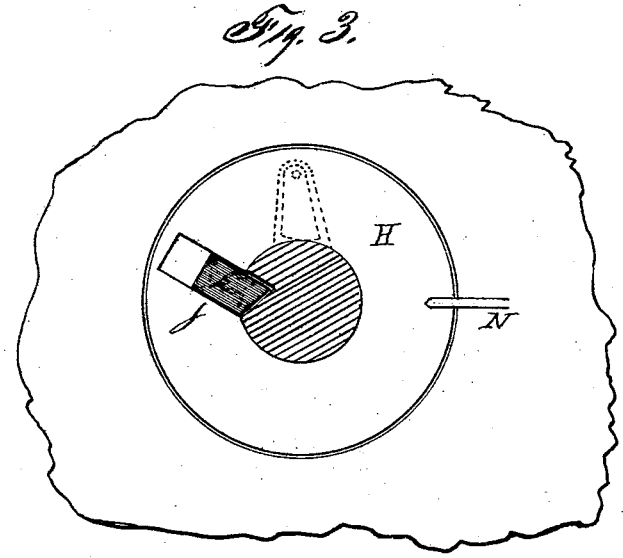

United States Patent Office.

CHARLES O. YALE, OF NEW YORK, N. Y.

Letters Patent No. 115,007, dated May 16, 1871.

IMPROVEMENT IN SELF-LOCKING SCREW-BOLTS FOR SAFES.

The Schedule referred to in these Letters Patent and making part of the same.

*To all whom it may concern:*

Be it known that I, CHARLES O. YALE, of the city, county, and State of New York, have invented an Improved Self-locking Screw-Bolt for Safes, of which the following is a specification.

This invention relates to the securing of conical screw-bolts used in the construction of safes for holding together the several layers of metal of which the wall of the safe is constituted.

Heretofore screw-bolts have been fastened by running a nut onto the small and protruding end of the bolt on the inside of the safe.

My invention has for its object the securing of the bolt in such a manner that when screwed home it shall be self-locked in place, and no part thereof be left projecting from either side of the wall, making a bolt which never can be removed when finally put in its place.

To enable others skilled in the art to make and use my invention, I will proceed to describe the same.

In the drawing annexed—

A is the screw-bolt.

It passes through several thicknesses of iron, $c \; e \; f \; i \; g$, $c$ being the inner and $g$ the outer surface.

H represents a nut secured in a metal plate, $c$.

In one side of the nut a recess, $j$, is formed, and in this is inserted a pawl, $k$, fitted to slide freely therein.

In the threaded portion of the bolt a notch or groove is formed, and the shape of the groove and that of the end of the pawl $k$ are such that when the bolt is being screwed into the nut, or *vice versa*, the notch acts as a ratchet to throw the pawl out of said notch; but at each revolution of the bolt a spring, $l$, behind the pawl, pushes it into the notch and prevents the bolt from being unscrewed.

When, therefore, the bolt is once sent home, the pawl $k$ takes into the notch and permanently locks it in place.

The bolt is turned by a wrench adapted to take hold of pins or depressions $m$ on the head of the bolt, such pins or depressions to be afterward filled up or removed.

In some cases it may be found desirable to have the pawl on the bolt and the groove in the nut; and I have also indicated (in dotted lines) in fig. 3 an alternative for the sliding pawl in a swinging pawl, the operation of which is to bind on the bolt at any point thereon, when the bolt is turned backward.

To further secure the bolt against the possibility of being unscrewed, the nut is purposely made circular and held stationary while the bolt is being screwed in by a fragile device, such as the pin N, set in the metal plate $c$.

Such device is sufficiently stout to prevent the turning of the nut while the screw-bolt is free; but when locked to the nut a sudden turn of the bolt would wrench off the pin, when the nut H will revolve with the bolt.

I do not confine myself to specific forms in the above invention, but shall vary the same as circumstances may require.

A similar result for bending the bolt to those described is the slitting of the threaded end of the bolt and the insertion of a wedge, to be driven in by screwing the bolt into its place, the nut being previously tapped tapering from the back side.

I claim as my invention and desire to secure by Letters Patent—

A self-locking screw-bolt for safes, as herein described, constructed, applied, and used, substantially as and for the purpose specified.

CHAS. O. YALE.

Witnesses:
    E. H. SMITH,
    WM. H. JOHNSON.